(12) United States Patent
Yasuda et al.

(10) Patent No.: US 12,145,521 B2
(45) Date of Patent: Nov. 19, 2024

(54) LATERAL VEHICLE POSITION AND SEAT ORIENTATION CONTROL

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 381 days.

(21) Appl. No.: 17/476,756

(22) Filed: Sep. 16, 2021

(65) Prior Publication Data

US 2023/0085088 A1   Mar. 16, 2023

(51) Int. Cl.
*B60R 21/01* (2006.01)
*B60N 2/20* (2006.01)
*B60R 21/00* (2006.01)

(52) U.S. Cl.
CPC .............. *B60R 21/01* (2013.01); *B60N 2/20* (2013.01); *B60R 2021/003* (2013.01)

(58) Field of Classification Search
CPC ...... B60R 21/01; B60R 2021/003; B60N 2/20
See application file for complete search history.

(56) References Cited

U.S. PATENT DOCUMENTS

| | | | |
|---|---|---|---|
| 6,393,362 B1 | 5/2002 | Burns | |
| 8,055,412 B2 * | 11/2011 | Passaro | B60K 35/00 |
| | | | 701/49 |
| 9,965,959 B2 | 5/2018 | Kasame | |
| 2016/0090137 A1 * | 3/2016 | Mori | B60N 2/40 |
| | | | 701/49 |
| 2020/0164771 A1 * | 5/2020 | Unnervik | B60N 2/42745 |
| 2020/0276971 A1 | 9/2020 | Takeda et al. | |

OTHER PUBLICATIONS

Investigation of Haptic Feedback in the Driver Seat S. Fels, et al. Proceedings of the IEEE ITSC 2006, 2006 IEEE Intelligent Transportation Systems Conference Toronto, Canada, Sep. 17-20, 2006 (Year: 2006).*

"Design and evaluation of a vibrotactile seat to improve spatial awareness while driving" J. Morrell, et al., IEEE Haptics Symposium Mar. 25-26, 2010, Waltham, Massachusetts, USA (Year: 2010).*

(Continued)

*Primary Examiner* — Peter D Nolan
*Assistant Examiner* — Tanya C Sienko
(74) *Attorney, Agent, or Firm* — Christopher G. Darrow; Darrow Mustafa PC (57) ABSTRACT

Systems, methods, and other embodiments described herein relate to keeping a vehicle within a safety envelope. In one embodiment, a method includes determining a safety envelope having a boundary, determining a risk level for an environment surrounding the vehicle, and associating an index value with a location within the safety envelope based on at least one of the risk level and a relationship between the location and the boundary. The method includes, in response to a vehicle being located at the location, tilting a vehicle seat to a tilt angle relative to a floor of the vehicle. The tilt angle can be based on the index value associated with the location.

18 Claims, 5 Drawing Sheets

(56) References Cited

OTHER PUBLICATIONS

Jaguar Land Rover Limited 2021, "Land Rover Owner Information," https://www.ownerinfo.landrover.com/document/3B/2018/T23993/27118_de_DEU/proc/G2018390 (last downloaded Aug. 30, 2021) (4 pages).
United States Department of Transportation, National Highway Traffic Safety Administration (NHTSA), "Driver Assistance Technologies," nhtsa.gov/equipment/driver-assistance-technologies#llane-sideassist-30676 (article last downloaded Aug. 30, 2021) (15 pages).

* cited by examiner

LATERAL VEHICLE POSITION AND SEAT ORIENTATION CONTROL

TECHNICAL FIELD

The subject matter described herein relates, in general, to systems and methods for keeping a vehicle within a safety envelope.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with Advanced Driver-Assistance Systems (ADAS) such as Lane Keeping Assist System (LKAS) and/or Lane Departure Warning (LDW) to determine when the vehicle departs from the center of the lane or is about leaving the lane and beginning to approach the edge of the lane. These systems may warn a driver when the vehicle departs from the lane using a warning display, a warning sound, vibrations, or any other visual or audible indicators. However, the driver may not recognize what the warning means or the direction of the departure.

SUMMARY

This section generally summarizes the disclosure and is not a comprehensive explanation of its full scope or all its features.

In one embodiment, a method for keeping a vehicle within a safety envelope is disclosed. The method includes determining a safety envelope that has a boundary, determining a risk level for an environment surrounding the vehicle, and associating an index value with a location within the safety envelope based on at least one of the risk level and a relationship between the location and the boundary. The method includes, in response to a vehicle being located at the location, tilting a vehicle seat to a tilt angle relative to a floor of the vehicle. The tilt angle can be based on the index value associated with the location.

In another embodiment, a system for keeping a vehicle within a safety envelope is disclosed. The system includes a processor and a memory in communication with the processor. The memory stores a safety envelope determination module including instructions that, when executed by the processor, cause the processor to determine a safety envelope having a boundary. The memory stores a risk level determination module including instructions that, when executed by the processor, cause the processor to determine a risk level for an environment surrounding the vehicle. The memory stores an index determination module including instructions that, when executed by the processor, cause the processor to associate an index value with a location within the safety envelope based on at least one of the risk level and a relationship between the location and the boundary. The memory stores a seat tilt control module including instructions that, when executed by the processor, cause the processor to, in response to a vehicle being located at the location, tilt a vehicle seat to a tilt angle relative to a floor of the vehicle. The tilt angle can be based on the index value associated with the location.

In another embodiment, a non-transitory computer-readable medium for keeping a vehicle within a safety envelope and including instructions that, when executed by a processor, cause the processor to perform one or more functions, is disclosed. The instructions include instructions to determine a safety envelope having a boundary, determine a risk level for an environment surrounding the vehicle, associate an index value with a location within the safety envelope based on at least one of the risk level and a relationship between the location and the boundary, and in response to a vehicle being located at the location, tilt a vehicle seat to a tilt angle relative to a floor of the vehicle, the tilt angle being based on the index value associated with the location.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with keeping a vehicle within a safety envelope, are disclosed. A safety envelope may be defined as a zone within which the vehicle may travel safely as the vehicle travels along its trajectory. The safety envelope may have a left boundary that is distanced from and on the left side of the vehicle and a right boundary that is distanced from and on the right side of the vehicle. The safety envelope is dynamic and may change in shape based on the curvature of the path that the vehicle is traveling on and/or an obstacle along or proximate to the path. The safety envelope is a geometrical envelope based on geometrical boundaries of the vehicle's movement trajectory.

A vehicle departing from the safety envelope may be a danger to entities inside the vehicle such as passengers and pets, entities outside the vehicle such as pedestrians, other road users, and animals. Additionally, a vehicle departing from the safety envelope may result in damage to the vehicle or other property. Accordingly, in one embodiment, the disclosed approach is a Lateral Vehicle Position and Seat Orientation Control (LVPSOC) system that assists in keeping a vehicle within the safety envelope. The LVPSOC system can assist in keeping a vehicle within the safety envelope by indicating that the vehicle is departing from the center of the safety envelope and veering towards one of the two lateral boundaries of the safety envelope, i.e., the left or right boundary of the safety envelope using the tilt of one or more vehicle seats. When the vehicle is in or proximate to the center of the safety envelope, the LVPSOC system does not indicate that the vehicle is departing the center of the safety envelope and heading towards the left or right boundary. In such a case, the vehicle seat remains in an upright position, at a 90 degree angle to the lateral plane. When the vehicle departs the center of the safety envelope and veers towards the left boundary of the safety envelope, the LVPSOC system tilts the vehicle seat to the right, such that the top portion of the vehicle seat is tilted toward the center of the safety envelope and away from the left boundary. The closer the vehicle travels toward the boundary, the more the LVPSOC system tilts the vehicle seat to the right. In other words, the larger the tilt angle. Similarly, when the vehicle departs the center of the safety envelope and veers towards the right boundary of the safety envelope, the LVPSOC system tilts the vehicle seat to the left, such that the top portion of the vehicle seat is tilted toward the center of the safety envelope and away from the right boundary. The closer the vehicle travels toward the right boundary, the more the LVPSOC system tilts the vehicle seat to the left. In other words, the larger the tilt angle.

The tilt of the vehicle seat may indicate to the operator that the vehicle is heading to one of the boundaries of the safety envelope. A vehicle seat tilting towards the right indicates to the operator that the vehicle is veering towards the left boundary and a vehicle seat tilting towards the left indicates to the operator that the vehicle is veering towards the right boundary. If the operator responds to the indication by steering the vehicle towards the center of the safety envelope, the LVPSOC system may reduce the tilt angle of the vehicle seat as the vehicle approaches the center of the safety envelope until the vehicle is at or proximate to the center of the safety envelope, where the tilt angle will be zero and the vehicle seat is upright.

In addition to determining the value of the tilt angle based on the position of the vehicle in the safety envelope, the LVPSOC system may determine the value of the tilt angle based on potential dangers in the environment surrounding the safety envelope and/or the vehicle. As an example, the LVPSOC system may determine the potential danger and/or risk level if the vehicle travels past the boundary of the safety envelope and into the surrounding environment. As an example, the LVPSOC system may determine that the surrounding environment past the right boundary of the safety envelope is a cliff and the LVPSOC system may further determine that if the vehicle travels into that environment, there may be a fatality and/or injury to passengers in the vehicle and/or damage to the vehicle. As such, the LVPSOC system may increase the values of the tilt angles for locations between the center of the safety envelope and the right boundary to emphasize the potential danger and/or strongly discourage the operator. As such, the value of a tilt angle at a location in the safety envelope where there is a potential danger in the surrounding environment may be larger than the value of a tilt angle at the same location where there is no potential danger in the surrounding environment.

As another example, the LVPSOC system may determine that there is a vulnerable road user such as a pedestrian and/or a cyclist in the surrounding environment past the left boundary of the safety envelope. As such, the LVPSOC system may determine that if the vehicle travels into that environment, there may be a fatality and/or injury to pedestrians, cyclists and/or damage to the vehicle. As such, the LVPSOC system may increase the values of the tilt angles for locations between the center of the safety envelope and the left boundary to emphasize the potential danger and/or strongly discourage the operator. As such, the value of a tilt angle at a location in the safety envelope where there is a potential danger in the surrounding environment may be larger than the value of a tilt angle at the same location where there is no potential danger in the surrounding environment.

Although the above description discloses the top portion of the vehicle tilting towards the center of the safety envelope, the LVPSOC system can be configured for the vehicle seat to tilt in the opposite direction to the description above.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
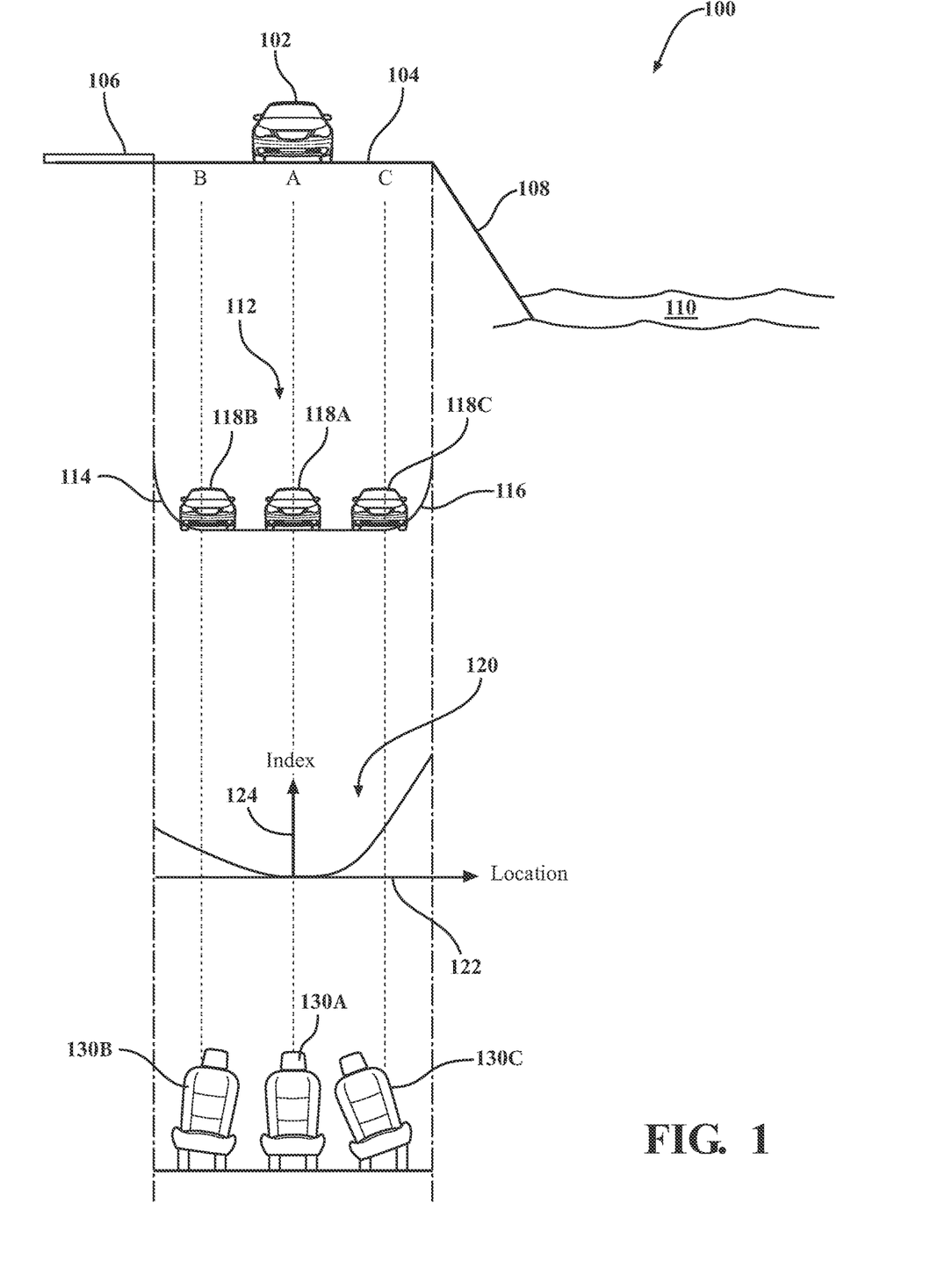
FIG. 1 is an example of a Lateral Vehicle Position and Seat Orientation Control (LVPSOC) system.

Referring to FIG. 1, an example of LVPSOC system 100 is shown. The vehicle 102 may include the LVPSOC system 100. The vehicle 102 travels on a path 104. On the left of the vehicle 102 is a grassy lawn 106 and on the right of the vehicle 102 is a cliff 108 with a body of water 110. The LVPSOC system 100 determines the safety envelope 112 and the boundary 114, 116 of the safety envelope based on the characteristics of the environment surrounding the vehicle 102. As such, the LVPSOC system 100 may adjust the boundaries 114, 116 of the safety envelope 112 as the vehicle 102 travels based on the boundaries of the path 104 and/or objects along or proximate to the path 104. As shown, the safety envelope 112 aligns with the flat path 104 that LVPSOC system 100 determines is safe for the vehicle 102 to travel on. The safety envelope 112 may be any suitable shape. The safety envelope 112 may have curved sides as shown, or may have an angular shape. As shown, an icon 118A, 118B, 118C (collectively known as 118) indicating the vehicle 102 may be displayed in the safety envelope 112. The safety envelope with an icon 118 for the vehicle 102 may be displayed on a vehicle display in a similar manner, as an example.

The LVPSOC system 100 then receives sensor data from vehicle sensors and/or any suitable environment sensors to determine the characteristics of the surrounding environment. The characteristics may include terrain, slope, and/or objects located in the environment. The LVPSOC system 100 determines the risk level based on predicting a potential danger if the vehicle 102 travel into the surrounding environment. The LVPSOC system 100 determines a high risk level for the right side of the vehicle 102 as the vehicle 102 traveling to the right may fall into the body of water 110. The LVPSOC system 100 determines a low risk for the left side of the vehicle 102 as, although still undesirable, the vehicle 102 would be traveling on grass 106 and posing no danger or at least, a lesser danger.

The LVPSOC system 100 determines an index value for one or more locations in the safety envelope based on the risk level and/or the relationship between the location and the boundary of the safety envelope. The relationship may be based on the lateral distance between the location and the boundary, more particularly, the closer boundary. Then, as shown, the LVPSOC system 100 may plot a graph 120 based on the locations 122 in the safety envelope and the associated index value 124.

In the case where the vehicle 102 remains in position A, at the center of the safety envelope, the vehicle seat 130A remains upright as shown. In the case where the vehicle 102 moves left towards position B, the vehicle seat 130B tilts right wards as shown. In the case where the vehicle 102 moves right towards position C, the vehicle seat 130C tilts left wards as shown.

Figure 2:
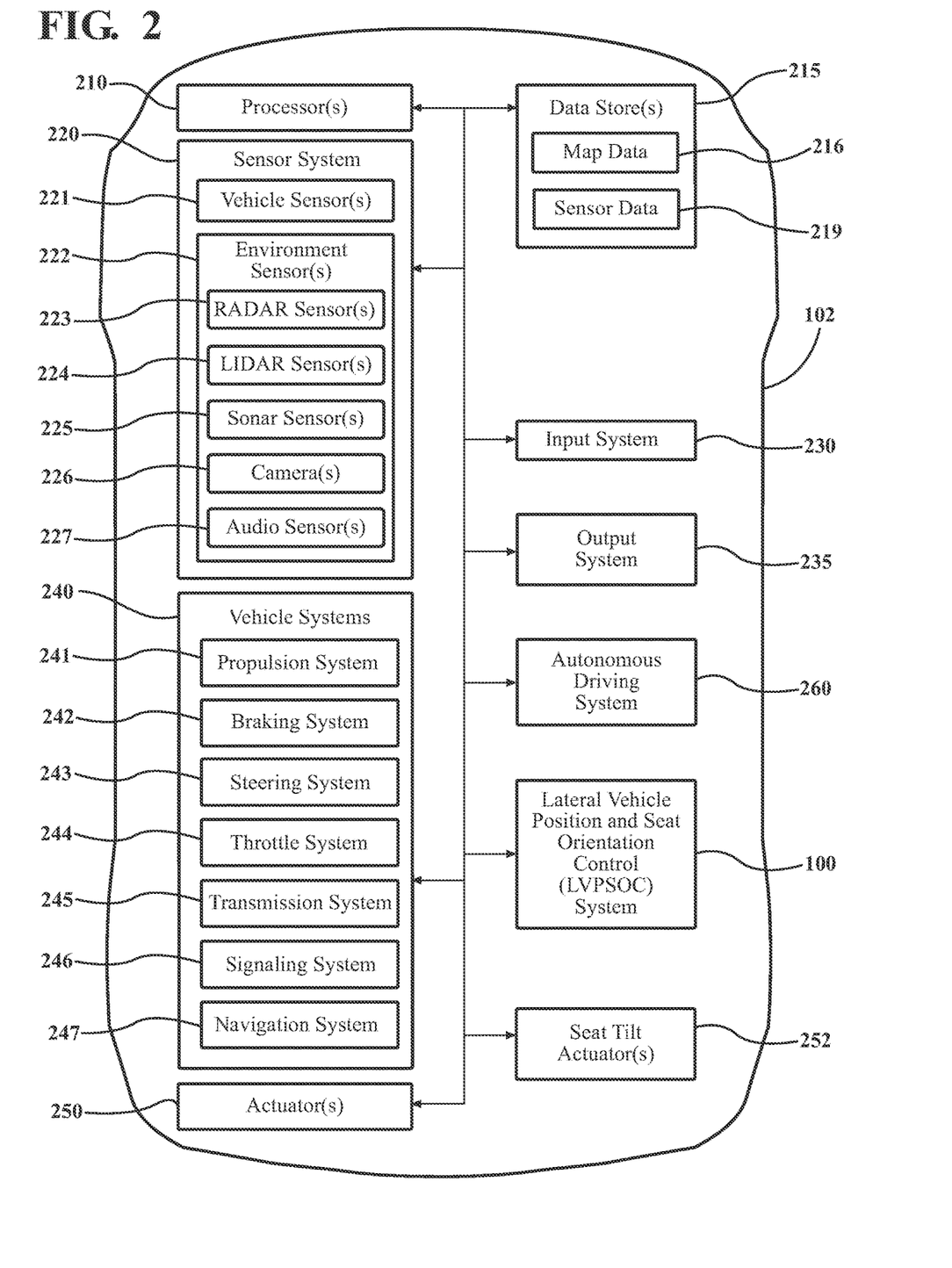
FIG. 2 illustrates a block diagram of a vehicle incorporating a LVPSOC system.

Referring to FIG. 2, a block diagram of a vehicle 102 incorporating a LVPSOC system 100 is illustrated. The vehicle 102 includes various elements. It will be understood that in various embodiments, it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances. For example, as discussed, one or more components of the disclosed system can be implemented within a vehicle while further components of the system may be implemented within a cloud-computing environment.

Some of the possible elements of the vehicle 102 are shown in FIG. 2 and will be described along with subsequent figures. However, a description of many of the elements in FIG. 2 will be provided after the discussion of FIGS. 3-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the vehicle 102 includes a LVPSOC system 100 that is implemented to perform methods and other functions as disclosed herein relating to keeping a vehicle within a safety envelope. As an example, the LVPSOC system 100, in various embodiments, may be implemented partially within the vehicle 102 and may further exchange communications with additional aspects of the LVPSOC system 100 that are remote from the vehicle 102 in support of the disclosed functions. Thus, while FIG. 2 generally illustrates the LVPSOC system 100 as being self-contained, in various embodiments, the LVPSOC system 100 may be implemented within multiple separate devices some of which may be remote from the vehicle 102.

Figure 3:
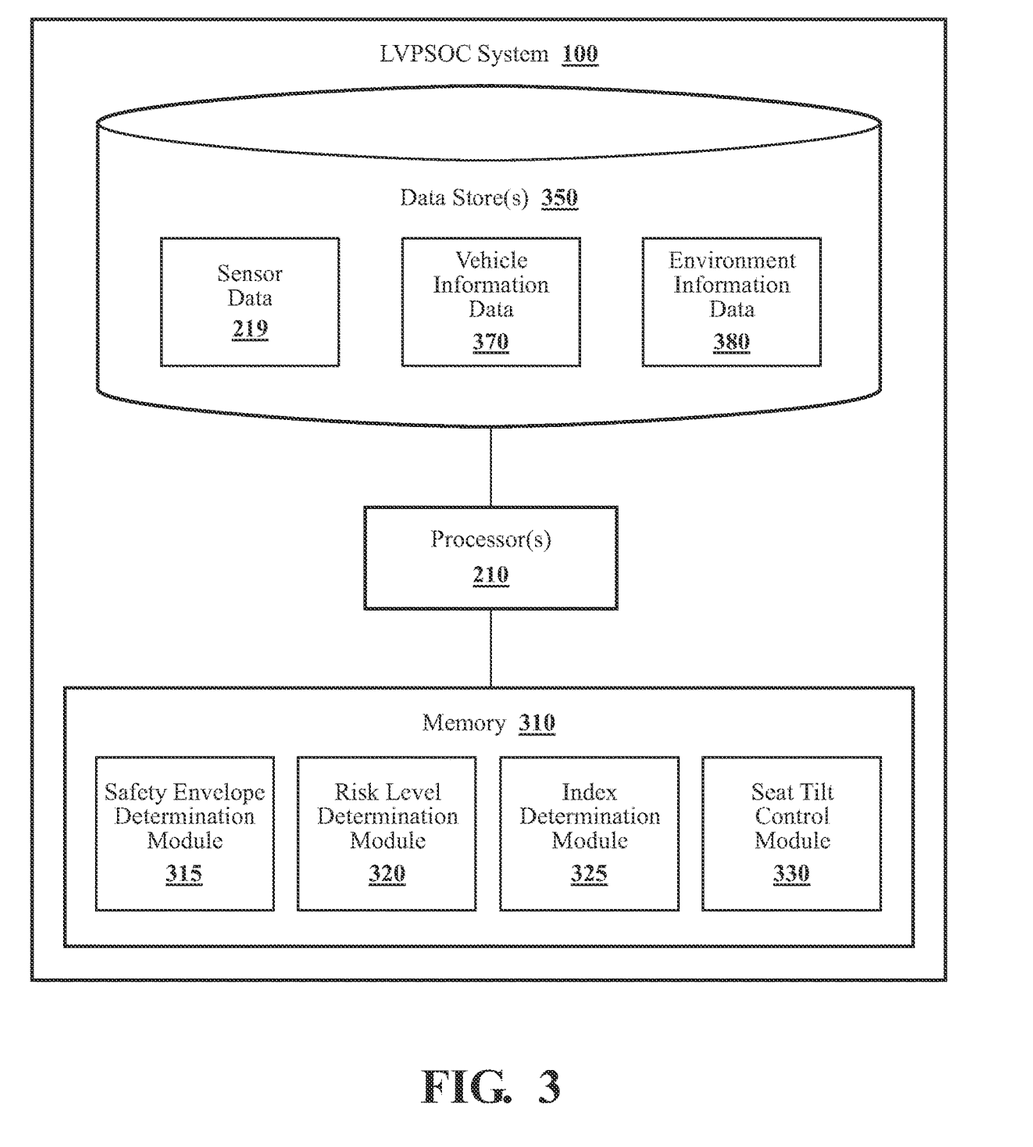
FIG. 3 illustrates one embodiment of a LVPSOC system.

With reference to FIG. 3, a more detailed block diagram of the LVPSOC system 100 is shown. The LVPSOC system 100 may include a processor(s) 210. Accordingly, the processor(s) 210 may be a part of the LVPSOC system 100, or the LVPSOC system 100 may access the processor(s) 210 through a data bus or another communication pathway. In one or more embodiments, the processor(s) 210 is an application-specific integrated circuit that may be configured to implement functions associated with a safety envelope determination module 315, a risk level determination module 320, an index determination module 325, and/or a seat tilt control module 330. More generally, in one or more aspects, the processor(s) 210 is an electronic processor, such as a microprocessor that can perform various functions as described herein when loading the modules 315-330 and executing encoded functions associated therewith.

The LVPSOC system 100 may include a memory 310 that stores the safety envelope determination module 315, the risk level determination module 320, the index determination module 325, and the seat tilt control module 330. The memory 310 may be a random-access memory (RAM), read-only memory (ROM), a hard disk drive, a flash memory, or other suitable memory for storing the modules 315-330. The modules 315-330 are, for example, computer-readable instructions that, when executed by the processor(s) 210, cause the processor(s) 210 to perform the various functions disclosed herein. While, in one or more embodiments, the modules 315-330 are instructions embodied in the memory 310, in further aspects, the modules 315-330 include hardware, such as processing components (e.g., controllers), circuits, etc. for independently performing one or more of the noted functions.

The LVPSOC system 100 may include a data store(s) 350 for storing one or more types of data. Accordingly, the data store(s) 350 may be a part of the LVPSOC system 100, or the LVPSOC system 100 may access the data store(s) 350 through a data bus or another communication pathway. The data store(s) 350 is, in one embodiment, an electronically based data structure for storing information. In at least one approach, the data store 350 is a database that is stored in the memory 310 or another suitable medium, and that is configured with routines that can be executed by the processor(s) 210 for analyzing stored data, providing stored data, organizing stored data, and so on. In either case, in one embodiment, the data store 350 stores data used by the modules 315-330 in executing various functions. In one embodiment, the data store 350 may be able to store sensor data 219, vehicle information data 370, environment information data 380, and/or other information that is used by the modules 315-330.

The data store(s) 350 may include volatile and/or non-volatile memory. Examples of suitable data stores 350 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 350 may be a component of the processor(s) 210, or the data store(s) 350 may be operatively connected to the processor(s) 210 for use thereby. The term "operatively connected" or "in communication with" as used throughout this description, can include direct or indirect connections, including connections without direct physical contact.

In one or more arrangements, the data store(s) 350 can include sensor data 219. The sensor data 219 can originate from the sensor system 220 of the vehicle 102. Additionally and/or alternatively, the sensor data 219 may originate from one or more external sources. The external sources may include any entities capable of wireless communication such as other vehicles, roadside units, and/or servers. The sensor data 219 can include data from visual sensors and audio sensors.

In one or more arrangements, the data store(s) 350 can include vehicle information data 370. The vehicle information data 370 may include information about the vehicle 102 such as the type of vehicle, the model type of the vehicle, the ground clearance, the dimensions of the vehicle, the weight of the vehicle, and/or the condition of the vehicle. The vehicle information data 370 may include information about the occupants of the vehicle such as the number of passengers.

In one or more arrangements, the data store(s) 350 can include environment information data 380. The environment information data 380 may include information about the environment surrounding the vehicle 102 such as the location and condition of the path that the vehicle 102 is traveling on. The location of the path(s) may include geographic coordinates of the path and the position of the path relative to a destination. The condition of the path may include traffic levels on the path as well as traffic rules based on the jurisdiction at the location of the path. The condition of the path can include information about the physical condition of the path such as the presence of potholes, road debris, vegetation, occlusions and/or the presence of road delineators such as lane markers, road edge markers, traffic signs, traffic lights, and communicative roadside units. The location, dimensions and conditions of the path can be described as the path type.

Additionally and/or alternatively, the environment information data 380 can include conditions in the environment such as a weather condition, a road condition, air quality, light levels, and/or a timestamp. A weather condition may include, as an example, presence of precipitation such as snow, rain, and/or hail. The weather condition may further include impacts of weather such as fog levels, fallen snow levels (i.e. the amount of snow on the ground), and/or flooding. The sensor data 219, the vehicle information data 370, and the environment information data 380 may be digital data that describe information used by the LVPSOC system 100 to assist in keeping a vehicle within a safety envelope.

In one embodiment, the safety envelope determination module 315 may include instructions that, when executed by the processor(s) 210, cause the processor(s) 210 to determine a safety envelope 112 having a boundary 114, 116. As an example, the safety envelope determination module 315 can further include instructions that, when executed by the processor(s) 210, cause the processor(s) 210 to determine the boundary 114, 116 of the safety envelope 112 based on a characteristic of the environment surrounding the vehicle 102. The characteristics of environment can include a road marking, curvature of the road, an obstacle on the road, road elevation, and/or a road surface condition.

The safety envelope determination module 315 may receive sensor data 219, vehicle information data 370, and/or environment information data 380 from the data store(s) 350.

As an example, the safety envelope determination module 315 may determine the boundary 114, 116 of the safety envelope 112 based on a predetermined distance from the vehicle 102 and/or the characteristics of the environment. In such an example, the safety envelope determination module 315 may start by determining that the right boundary is three meters from the right side of the vehicle 102 and the left boundary is two meters from the left side of the vehicle 102. As another example, the safety envelope determination module 315 may determine the left and right boundaries 114, 116 based on road markings, sidewalks, and/or other visible road edges such as a fence, grass or trees. The safety envelope determination module 315 may receive information about an obstacle on the road within the determined boundary of the safety envelope 112 from the sensor data 219, vehicle information data 370, and/or the environment information data 380, and may adjust the boundary 114, 116 towards the vehicle 102 to exclude the obstacle.

The safety envelope determination module 315 may periodically update the safety envelope 112 as the safety envelope determination module 315 receives information about the environment such as obstacles in the environment. The safety envelope determination module 315 may use any suitable algorithm, such as a machine learning algorithm or an artificial intelligence process to determine a safety envelope 112 having a boundary 114, 116. The boundary 114, 116 may be lateral boundaries on the left side and/or the right side of the vehicle 102 respectively.

In one embodiment, the risk level determination module 320 may include instructions that, when executed by the processor(s) 210, cause the processor(s) 210 to determine a risk level for an environment surrounding the vehicle 102. As an example, the risk level determination module 320 can further include instructions that, when executed by the processor(s) 210, cause the processor(s) 210 to determine the risk level based on a characteristic of the environment surrounding the vehicle 102. As another example, the risk level determination module 320 can further include instructions that, when executed by the processor(s) 210, cause the processor(s) 210 to determine the risk level based on at least one of a danger to an entity in the vehicle 102, a danger to an entity outside the vehicle 102, and damage to the vehicle 102. As an example, the entity outside the vehicle 102 may be a pedestrian. As another example, the risk level determination module 320 can further include instructions that, when executed by the processor(s) 210, cause the processor(s) 210 to determine the risk level based on a characteristic of the vehicle 102. The risk level determination module 320 may use any suitable algorithm such as a machine learning algorithm or an artificial intelligence process to determine the risk level, which can be the level of danger to an entity in the vehicle 102 such as a passenger, the level of danger to an entity outside the vehicle 102 such as pedestrian or an animal, and/or to the level of danger to the vehicle 102 such as damage to the vehicle 102.

As an example, the risk level determination module 320 may determine the risk level for the environment surrounding the vehicle 102 by receiving sensor data 219 indicating the terrain on either side of the vehicle 102 and/or the safety envelope 112. The risk level determination module 320 may determine the risk level based on the potential impact of the vehicle 102 traveling on the identified terrain. The potential impact may cause a danger to an entity such as a passenger in the vehicle 102, and/or damage to the vehicle 102. As example, if the terrain is a cliff with a sharp drop where the potential impact may be a fatality, an injury to a passenger, and/or damage to the vehicle 102, the risk level determination module 320 may determine the risk level to be a high value. As another example, if the terrain is a flat, wide, and paved surface where there is little or no potential impact to passengers and/or the vehicle 102, the risk level determination module 320 may determine the risk level to be a lower value. As another example, if the terrain is a bumpy, grassy area where there is little impact to passengers, the risk level determination module 320 may determine the risk level to be a lower value relative to the value for the cliff, as an example.

Additionally and/or alternatively, the risk level determination module 320 may determine the risk level for the environment surrounding the vehicle 102 by receiving sensor data 219 indicating one or more objects located on either side of the vehicle 102 and/or the safety envelope 112. The risk level determination module 320 may determine the risk level based on the potential impact of the vehicle 102 colliding with the identified object. The potential impact may cause a danger to an entity in the vehicle 102 such as a passenger, an entity outside the vehicle 102 such as a pedestrian, and/or damage to the vehicle 102. As example, if the identified object is a pedestrian where the potential impact may be a fatality of the pedestrian and/or a passenger, an injury to the pedestrian and/or the passenger, and/or damage to the vehicle 102, the risk level determination module 320 may determine the risk level to be a high value. As another example, if the identified object is a pile of leaves where there is little or no potential impact to passengers and/or the vehicle 102, the risk level determination module 320 may determine the risk level to be a lower value. As another example, if the identified object is a vehicle where the potential impact may be a fatality of the pedestrian and/or a passenger in either vehicle, an injury to the pedestrian and/or the passenger in either vehicle, and/or damage to either vehicle, the risk level determination module 320 may determine the risk level to be a high value.

The risk level determination module 320 may determine the risk level based on a characteristic of the vehicle 102. In such a case, the risk level determination module 320 may receive information about the vehicle 102 from the vehicle information data 370 and may determine that a vehicle 102 with a low ground clearance may not have the ability to navigate an identified hilly terrain and the risk level determination module 320 may determine the risk level to be a high value. However, the risk level determination module 320 may determine that a vehicle 102 with a high ground clearance may have the ability to navigate the identified hilly terrain and the risk level determination module 320 may determine that the risk level to be a low value.

In one embodiment, the index determination module 325 may include instructions that, when executed by the processor(s) 210, cause the processor(s) 210 to associate an index value with a location within the safety envelope 112 based on at least one of the risk level and a relationship between the location and the boundary 114, 116. As an example, the index determination module 325 can further include instructions that, when executed by the processor(s) 210, cause the processor(s) 210 to determine the relationship between the location and the boundary 114, 116 based on a lateral distance between the location and the boundary 114, 116.

As an example, the index determination module 325 may identify locations within the safety envelope 112 using sensor data 219 and/or GPS data. The location may be any point between the boundary 114, 116 of the safety envelope 112 on one side of the vehicle 102 and the boundary 114, 116 of the safety envelope 112 on the other side of the vehicle 102, extending across the vehicle 102. The index determination module 325 may then receive and compare the risk level for the two boundaries 114, 116, the boundary 114 on the left of the vehicle 102 and the boundary 116 on the right of the vehicle 102 to determine which boundary 114, 116 has a higher risk level. In a case where the risk level at the two boundaries 114, 116 are the same, the index determination module 325 may assign the maximum index value to the two boundaries 114, 116.

In a case where the risk level at one boundary 114, 116 is higher than the risk level at the other boundary 114, 116, the index determination module 325 may assign a maximum index value to the location at the boundary 114, 116 with the higher risk level. As an example, the index determination module 325 may determine the index value for the boundary 114, 116 with lower risk level as a factor of the maximum index value based on the ratio between the risk levels of the two boundaries 114, 116. The index determination module 325 can determine the index value of the center of the safety envelope 112 to be zero.

As an example, the index determination module 325 may determine the relationship between a location within the safety envelope 112 and the boundary 114, 116 of the safety envelope 112 based on a lateral distance between the location and the boundary 114, 116. In such an example, the index determination module 325 may determine the lateral distance between the location and the boundary 114, 116, and may determine the index value based on the lateral distance. In such a case, locations closer to the boundaries 114, 116 may have higher index values while locations farther away from the boundaries 114, 116 and closer to the center of the safety envelope 112 have lower index values.

The index determination module 325 may select any suitable equation to determine the index values for location points between the two boundaries 114, 116. As an example, the index determination module 325 may select an exponential curve to extend from the index value of zero at the center of the safety envelope 112 to the index values at the boundaries 114, 116. As another example, the index determination module 325 may select a linear equation to extend from the index of zero at the center of the safety envelope 112 to the index values at the boundaries 114, 116.

In one embodiment, the seat tilt control module 330 may include instructions that, when executed by the processor(s) 210, cause the processor(s) 210 to, in response to a vehicle 102 being located at a location within the safety envelope 112 and the boundary 114, 116 of the safety envelope 112, tilt a vehicle seat 130A, 130B, 130C to a tilt angle relative to a floor of the vehicle 102, the tilt angle being based on the index value associated with the location.

As an example, the seat tilt control module 330 may determine the location of the vehicle 102 within the safety envelope 112 and identify the index value associated with the determined location. The seat tilt control module 330 can associate one or more tilt angles with one or more index values. In other words and as an example, the seat tilt control module 330 can associate the tilt angle of zero with the index value of zero. In a case where the index value at one boundary 114 is 100 and the index value of the other boundary 116 is 50, the seat tilt control module 330 may associate a tilt angle of 60 degrees with the index value of 100 and a tilt angle of 30 degrees to the index value of 50. In such an example, the seat tilt control module 330 may associate a tilt angle of 15 degrees with an index value of 25, and so on.

The seat tilt control module 330 may determine the location of the vehicle 102 within the safety envelope 112 and whether the vehicle 102 is closer to the left boundary 114 or the right boundary 116 using sensor data 219 and GPS data. The seat tilt control module 330 may receive the index value associated with the location from the index determination module 325 and identify the tilt angle associated with the index value. The seat tilt control module 330 may then send a control signal to a seat tilt actuator 252 to tilt the vehicle seat 130A, 130B, 130C to the identified angle with the upper portion of the vehicle seat 130A, 130B, 130C pointing towards the center of the safety envelope 112 and away from the closer boundary 114, 116. The seat tilt control module 330 may periodically request and receive the location of the vehicle 102 within the safety envelope 112, and when the location changes, the seat tilt control module 330 may receive the index value associated with the new location, determine the tilt angle associated with the new index value, and send a control signal to the seat tilt actuator 252 to tilt the vehicle seat 130A, 130B, 130C to the new angle.

Figure 4:
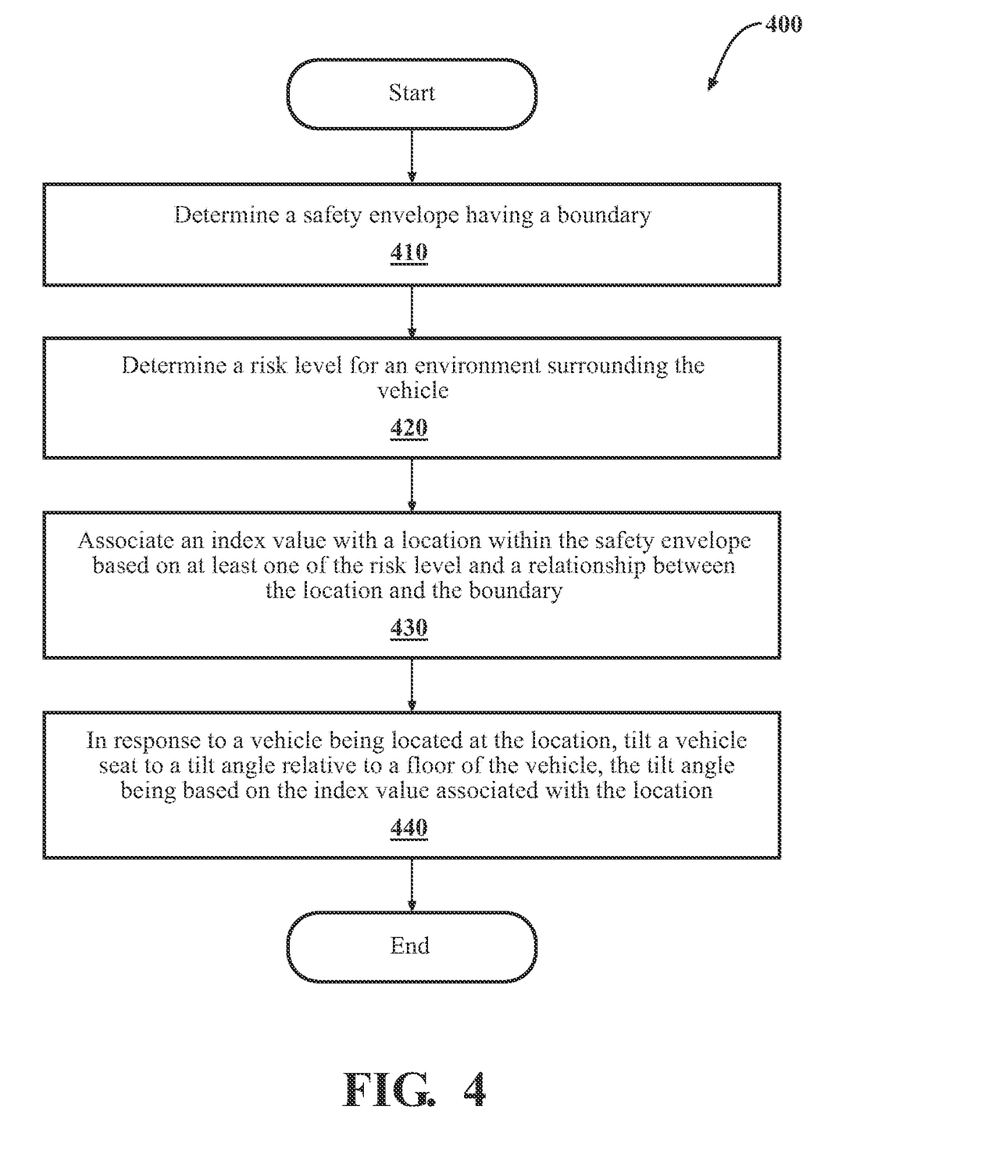
FIG. 4 is a flowchart illustrating one embodiment of a method for keeping a vehicle within a safety envelope.

FIG. 4 illustrates a method 400 for keeping a vehicle 102 within a safety envelope 112. The method 400 will be described from the viewpoint of the vehicle 102 of FIG. 2 and the LVPSOC system of FIG. 3. However, the method 400 may be adapted to be executed in any one of several different situations and not necessarily by the vehicle of FIG. 2 and/or the LVPSOC system of FIG. 3.

At step 410, the safety envelope determination module 315 may cause the processor(s) 210 to determine a safety envelope 112 and the boundary 114, 116 of the safety envelope 112. As an example, the safety envelope determination module 315 may cause the processor(s) 210 to determine the boundary 114, 116 of the safety envelope 112 based on a characteristic of the environment surrounding the vehicle 102. As previously mentioned, the safety envelope determination module 315 may determine the safety envelope 112 based on sensor data 219, vehicle information data 370, and/or environment information data 380 such as roadside obstacles.

At step 420, the risk level determination module 320 may cause the processor(s) 210 to determine a risk level for an environment surrounding the vehicle 102. As an example, the risk level determination module 320 may cause the processor(s) 210 to determine the risk level based on a characteristic of the environment surrounding the vehicle. As another example, the risk level determination module 320 may cause the processor(s) 210 to determine the risk level based on at least one of a danger to an entity in the vehicle 102, a danger to an entity outside the vehicle 102, and damage to the vehicle 102. As an example, the entity outside the vehicle 102 may be a pedestrian. As another example, the risk level determination module 320 may cause the processor(s) 210 to determine the risk level based on a characteristic of the vehicle 102. As previously mentioned, the risk level determination module 320 may determine the terrain and/or objects in the environment surrounding the vehicle 102. The risk level determination module 320 may determine the potential impact of the vehicle 102 traveling on the terrain and/or colliding with the objects in the environment.

At step 430, the index determination module 325 may cause the processor(s) 210 to associate an index value with a location within the safety envelope 112 based on at least one of the risk level and a relationship between the location and the boundary 114, 116. As an example, the index determination module 325 may cause the processor(s) 210 to determine the relationship between the location and the boundary 114, 116 based on a lateral distance between the location and the boundary 114, 116. As previously mentioned, the index determination module 325 may determine the index value of a location based on the risk level of the environment and/or the lateral distance between the location and the closer boundary 114, 116.

At step 440, the seat tilt control module 330 may cause the processor(s) 210 to, in response to the vehicle 102 being located at the location, tilt a vehicle seat 130A, 130B, 130C to a tilt angle relative to a floor of the vehicle 102, the tilt angle being based on the index value associated with the location. As previously mentioned, the seat tilt control module 330 may determine the location of the vehicle 102, the index value at the determined location, the tilt angle associated with the index value, and may output a signal to the seat tilt actuator 252 to tilt the vehicle seat 130A, 130B, 130C to the tilt angle with the top of the vehicle seat 130A, 130B, 130C leaning toward the center of the safety envelope 112 and away from the closer boundary 114, 116.

Figure 5:
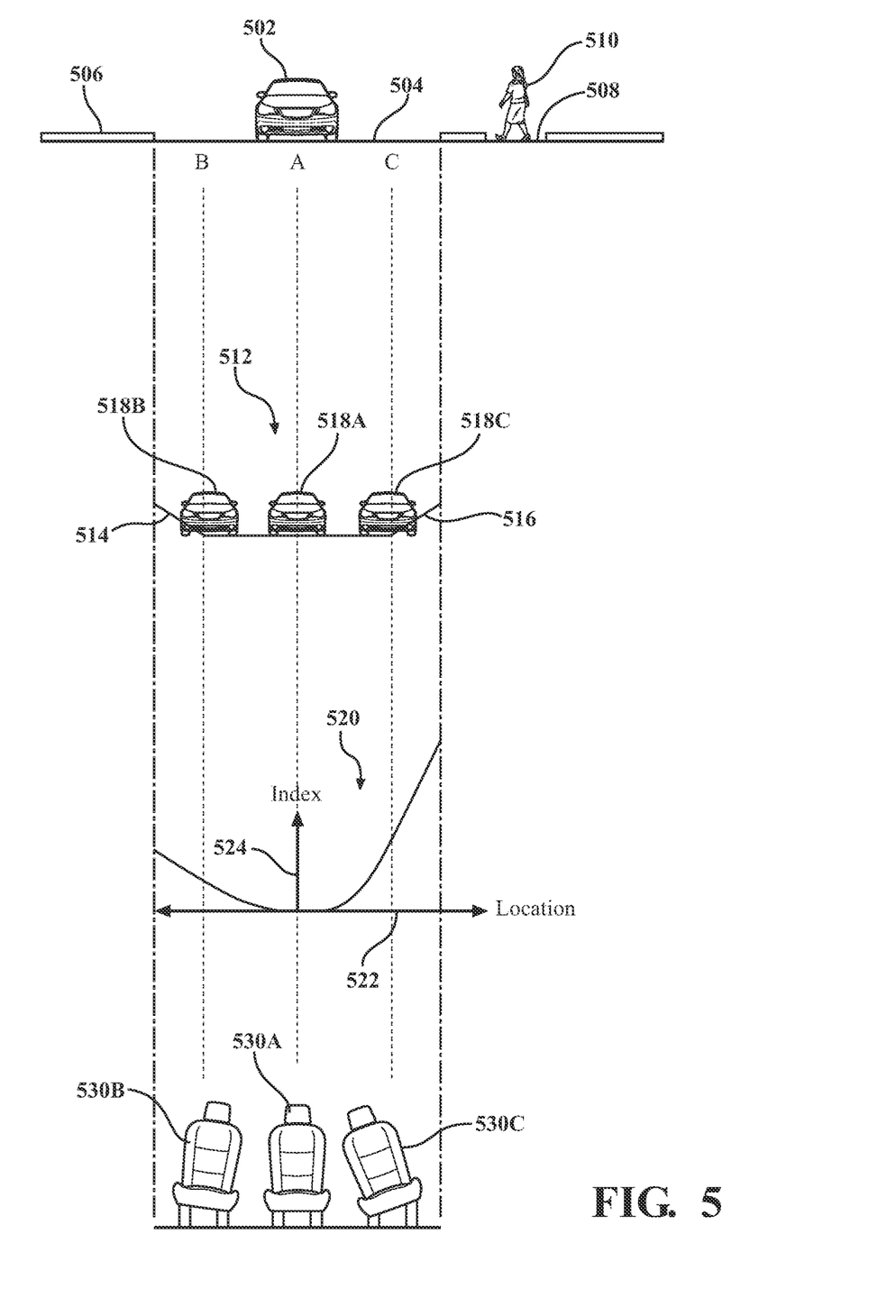
FIG. 5 is an example of a scenario for keeping a vehicle within a safety envelope.

A non-limiting example of the operation of the LVPSOC system 100 and/or one or more of the methods will now be described in relation to FIG. 5. FIG. 5 shows an example of assisting in keeping a vehicle within a safety envelope scenario.

FIG. 5 shows a vehicle 502, which is similar to the vehicle 102 disclosed above, traveling on a path 504. The path 504 has a grassy lawn 506 on the left of the vehicle 502 and has a sidewalk 508 on the right of the vehicle 502. As shown, there is a pedestrian 510 walking on the sidewalk 508.

The LVPSOC system 100, or more specifically, the safety envelope determination module 315 can determine a safety envelope 512 that has a left boundary 514 and a right boundary 516. As an example and as shown, the safety envelope determination module 315 may use sensor data 219 and/or environment information data 380, and may determine the safety envelope 512 to align with the level surface of the path 504 and the boundaries 514, 516 with the grassy edges. The display interface may display a rendition of the safety envelope 512 and the vehicle 518A, 518B, 518C at various locations within the safety envelope, depending on the location of the vehicle 502.

The LVPSOC system 100, or more specifically, the risk level determination module 320 may determine a risk level for an environment surrounding the vehicle 502. As an example, the risk level determination module 320 may determine that there is a pedestrian 510 on the sidewalk 508 to the right of the vehicle 502 based on sensor data 219. The risk determination module 320 may determine that there is a high risk of fatality and/or injury to the pedestrian 510 if the vehicle 502 travels rightwards into the environment surrounding the vehicle 502. The risk level determination module 320 may assign the environment on the left a low risk value as there is a lesser risk of danger such as injury or damage.

The LVPSOC system 100, or more specifically, the index determination module 325 may associate an index value 524 with a location 522 within the safety envelope 512 based on at least one of the risk level and a relationship between the location and the boundary 514, 516. As an example, the index determination module 325 may determine the index value 524 for the location(s) 522 based on the risk level in the surrounding environment and the distance between the location(s) 522 and the boundaries 514, 516. As shown, a graph of index values 520 is higher on the right of the vehicle 502, towards the pedestrian 510, to indicate the higher risk of danger to the pedestrian 510.

The LVPSOC system 100, or more specifically, the seat tilt control module 330 may, in response to the vehicle 502 being located at a location, tilt a vehicle seat 530A, 530B, 530C to a tilt angle relative to a floor of the vehicle 502, the tilt angle being based on the index value associated with the location. As shown, when the vehicle 502 is in position A, the vehicle seat 530A remains upright. When the vehicle 502 is in position B, close to the grass 506, the seat tilt control module 330 sends a control signal to the seat tilt actuator 252 associated with the vehicle seat 530B, instructing the seat tilt actuator 252 to tilt the vehicle seat 530B towards the center of the safety envelope 512 at a relatively small angle such as 15 degrees, as shown. When the vehicle 502 is in position C, close to the pedestrian 510, the seat tilt control module 330 sends a control signal to the seat tilt actuator 252 associated with the vehicle seat 530C, instructing the seat tilt actuator 252 to tilt the vehicle seat 530C towards the center of the safety envelope 512 at a relatively large angle such as 45 degrees, as shown.

FIG. 2 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle, but may be able to operate in a semi-autonomous or non-autonomous mode. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 210. In one or more arrangements, the processor(s) 210 can be a main processor of the vehicle 102. For instance, the processor(s) 210 can be an electronic control unit (ECU). The vehicle 102 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 260-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

The one or more data stores 215 can include sensor data 219. In this context, "sensor data" means any information about the sensors that the vehicle 102 is equipped with, including the capabilities and other information about such sensors. As will be explained below, the vehicle 102 can include the sensor system 220. The sensor data 219 can relate to one or more sensors of the sensor system 220. As an example, in one or more arrangements, the sensor data 219 can include information on one or more vehicle sensors 221 and/or environment sensors 222 of the sensor system 220.

In some instances, at least a portion of the map data 216 and/or the sensor data 219 can be located in one or more data stores 215 located onboard the vehicle 102. Alternatively, or in addition, at least a portion of the map data 216 and/or the sensor data 219 can be located in one or more data stores 215 that are located remotely from the vehicle 102.

As noted above, the vehicle 102 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the vehicle 102 (including any of the elements shown in FIG. 1). The sensor system 220 can acquire data of at least a portion of the internal environment as well as the external environment of the vehicle 102 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 102 itself. In one or more arrangements, the vehicle sensor(s) 221 can be configured to detect, and/or sense position and orientation changes of the vehicle 102, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 102. In one or more arrangements, the vehicle sensor(s) 221 can include a speedometer to determine a current speed of the vehicle 102.

Alternatively, or in addition, the sensor system 220 can include one or more environment sensors 222 configured to acquire, and/or sense data inside the vehicle 102 as well as around the vehicle 102. Sensor data 219 inside the vehicle 102 can include information about one or more users in the vehicle cabin and any other objects of interest. Sensor data 219 around the vehicle 102 can include information about the external environment in which the vehicle 102 is located or one or more portions thereof.

As an example, the one or more environment sensors 222 can be configured to detect, quantify and/or sense objects in at least a portion of the internal and/or the external environment of the vehicle 102 and/or information/data about such objects.

In the internal environment of the vehicle 102, the one or more environment sensors 222 can be configured to detect, measure, quantify, and/or sense human users inside the vehicle 102 and the facial expressions of the users. In the external environment, the one or more environment sensors 222 can be configured to detect, measure, quantify, and/or sense objects in the external environment of the vehicle 102, such as, for example, lane markers, signs, traffic lights, traffic signs, lane lines, crosswalks, curbs proximate the vehicle 102, off-road objects, electronic roadside devices, etc.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 can include one or more radar sensors 223, one or more LIDAR sensors 224, one or more sonar sensors 225, one or more cameras 226, and/or one or more audio sensors 227. In one or more arrangements, the one or more cameras 226 can be high dynamic range (HDR) cameras or infrared (IR) cameras.

The vehicle 102 can include an input system 230. An "input system" includes any device, component, system, element or arrangement or groups thereof that enable information/data to be entered into a machine. The input system 230 can receive an input from a user (e.g., a driver or a passenger). The vehicle 102 can include an output system 235. An "output system" includes any device, component, or arrangement or groups thereof that enable information/data to be presented to a user (e.g., a person, a vehicle passenger, etc.) such as a display interface. The display interface may display the safety envelope and the position of the vehicle within the safety envelope in any suitable format. As an example, the display interface may display the vehicle and the safety envelope to scale. As an example, the display interface may display the safety envelope as a "bathtub" curve, as shown in FIG. 1. In such an example, the display interface may display the vehicle as an icon. As an example, when the vehicle is closer to the left boundary of the safety envelope, the interface display may display the icon of the vehicle closer to the left boundary of the displayed safety envelope, and when the vehicle is closer to the right boundary of the safety envelope, the interface display may display the icon of the vehicle closer to the right boundary of the displayed safety envelope. In a case where the displayed safety envelope and the vehicle are being displayed to scale, the closer the vehicle is to, as an example, the left boundary, the closer the icon of the vehicle is to the left boundary of the displayed safety envelope.

The vehicle 102 can include one or more vehicle systems 240. Various examples of the one or more vehicle systems 240 are shown in FIG. 2. However, the vehicle 102 can include more, fewer, or different vehicle systems 240. It should be appreciated that although particular vehicle systems are separately defined, each or any of the systems or portions thereof may be otherwise combined or segregated via hardware and/or software within the vehicle 102. The vehicle 102 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 102 and/or to determine a travel route for the vehicle 102. The navigation system 247 can include one or more mapping applications to determine a travel route for the vehicle 102. The navigation system 247 can include a global positioning system, a local positioning system or a geolocation system.

The vehicle 102 can include one or more autonomous driving systems 260. The autonomous driving system 260 can include one or more devices, applications, and/or combinations thereof, now known or later developed, configured to control the movement, speed, maneuvering, heading, direction, etc. of the vehicle 102. The autonomous driving system 260 can include one or more driver assistance systems such as a lane keeping system, a lane centering system, a collision avoidance system, and/or a driver monitoring system.

The autonomous driving system(s) 260 can be configured to receive data from the sensor system 220 and/or any other type of system capable of capturing information relating to the vehicle 102 and/or the external environment of the vehicle 102. In one or more arrangements, the autonomous driving system(s) 260 can use such data to generate one or more driving scene models. The autonomous driving system(s) 260 can determine position and velocity of the vehicle 102. The autonomous driving system(s) 260 can determine the location of obstacles, obstacles, or other environmental features including traffic signs, trees, shrubs, neighboring vehicles, pedestrians, etc.

The autonomous driving system(s) 260 can be configured to receive, and/or determine location information for obstacles within the external environment of the vehicle 102 for use by the processor(s) 210, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving system(s) 260 either independently or in combination with the LVPSOC system 100 can be configured to determine travel path(s), current autonomous driving maneuvers for the vehicle 102, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving system(s) 260 can be configured to implement determined driving maneuvers. The autonomous driving system(s) 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system(s) 260 can be configured to execute various vehicle functions and/or to transmit data to, receive data from, interact with, and/or control the vehicle 102 or one or more systems thereof (e.g., one or more of vehicle systems 240).

The processor(s) 210, the LVPSOC system 100, and/or the autonomous driving system(s) 260 can be operatively connected to communicate with the various vehicle systems 240 and/or individual components thereof. For example, returning to FIG. 1, the processor(s) 210, the LVPSOC system 100, and/or the autonomous driving system(s) 260 can be in communication to send and/or receive information from the various vehicle systems 240 to control the movement, speed, maneuvering, heading, direction, etc. of the vehicle 102. The processor(s) 210, the LVPSOC system 100, and/or the autonomous driving system(s) 260 may control some or all of these vehicle systems 240 and, thus, may be partially or fully autonomous.

The processor(s) 210, the LVPSOC system 100, and/or the autonomous driving system(s) 260 may be operable to control the navigation and/or maneuvering of the vehicle 102 by controlling one or more of the vehicle systems 240 and/or components thereof. As an example, when operating in an autonomous mode, the processor(s) 210, the LVPSOC system 100, and/or the autonomous driving system(s) 260 can control the direction and/or speed of the vehicle 102. As another example, the processor(s) 210, the LVPSOC system 100, and/or the autonomous driving system(s) 260 can activate, deactivate, and/or adjust the parameters (or settings) of the one or more driver assistance systems. The processor(s) 210, the LVPSOC system 100, and/or the autonomous driving system(s) 260 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 may include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving system(s) 260. Any suitable actuator can be used. For instance, the one or more actuators 250 can include motors, pneumatic actuators, hydraulic pistons, relays, solenoids, and/or piezoelectric actuators, just to name a few possibilities.

The vehicle 102 may include one or more seat tilt actuators 252. The seat tilt actuator(s) 252 may be of any suitable tilting mechanism. As an example, each vehicle seat 130A, 130B, 130C in the vehicle 102 may be attached to a seat tilt actuator 252. The seat tilt actuator(s) 252 may be located between the base of the vehicle seat 130A, 130B, 130C and the floor of the vehicle 102. The seat tilt actuator(s) 252 may be configured to tilt the vehicle seat 130A, 130B, 130C 90 degrees to the left and 90 degrees to the right along the lateral plane. Alternatively, the seat tilt actuator(s) 252 may be configured to tilt the vehicle seat to a lesser degree on both sides such as 60 degrees to the left and 60 degrees to the right. As another alternative, the seat tilt actuator(s) 252 may configured to tilt the vehicle seat to two separate degrees for the two directions. In other words, the seat tilt actuator(s) 252 may be configured to tilt the vehicle seat 130A, 130B, 130C 40 degrees in one direction and 60 degrees in the other direction.

As another example, the driver seat 130A, 130B, 130C may be attached to the seat tilt actuator(s) 252 and the other vehicle seats 130A, 130B, 130C in the vehicle 102 may not be attached to seat tilt actuator(s) 252. In the case where there are multiple vehicle seats 130A, 130B, 130C attached to seat tilt actuator(s) 252, the seat tilt actuator(s) 252 may operate in unison or independently. The seat tilt actuator(s) 252 may receive a control signal, a tilt angle, and a tilt direction from the seat tilt control module 330, indicating that the seat tilt actuator 252 tilt the vehicle seat 130A, 130B, 130C to the related tilt angle in the related tilt direction. The seat tilt actuator 252 may tilt the vehicle seat 130A, 130B, 130C to the related angle relative to any suitable level surface such as the floor of the vehicle 102 or the ground underneath the vehicle 102.

The vehicle 102 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data stores 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising the steps of:
   determining a safety envelope having a boundary;
   determining a risk level for an environment surrounding a vehicle;
   associating an index value with a location within the safety envelope based on at least one of the risk level and a relationship between the location and the boundary, the relationship between the location and the boundary being based on a lateral distance between the location and the boundary; and
   in response to the vehicle being located at the location, tilting a vehicle seat to a tilt angle relative to a floor of the vehicle, the tilt angle being based on the index value associated with the location.

2. The method of claim 1, wherein determining the boundary of the safety envelope is based on a characteristic of the environment surrounding the vehicle.

3. The method of claim 1, wherein the risk level is based on a characteristic of the environment surrounding the vehicle.

4. The method of claim 1, wherein the risk level is based on at least one of a danger to an entity in the vehicle, a danger to an entity outside the vehicle, and damage to the vehicle.

5. The method of claim 4, wherein the entity outside the vehicle is a pedestrian.

6. The method of claim 1, wherein the risk level is based on a characteristic of the vehicle.

7. A system comprising:
a processor; and
a memory in communication with the processor, the memory including:
a safety envelope determination module having instructions that, when executed by the processor, cause the processor to determine a safety envelope having a boundary,
a risk level determination module having instructions that, when executed by the processor, cause the processor to determine a risk level for an environment surrounding a vehicle,
an index determination module having instructions that, when executed by the processor, cause the processor to associate an index value with a location within the safety envelope based on at least one of the risk level and a relationship between the location and the boundary, the relationship between the location and the boundary being based on a lateral distance between the location and the boundary, and
a seat tilt control module having instructions that, when executed by the processor, cause the processor to, in response to the vehicle being located at the location, tilt a vehicle seat to a tilt angle relative to a floor of the vehicle, the tilt angle being based on the index value associated with the location.

8. The system of claim 7, wherein the safety envelope determination module further includes instructions that when executed by the processor cause the processor to determine the boundary of the safety envelope based on a characteristic of the environment surrounding the vehicle.

9. The system of claim 7, wherein the risk level determination module further includes instructions that when executed by the processor cause the processor to determine the risk level based on a characteristic of the environment surrounding the vehicle.

10. The system of claim 7, wherein the risk level determination module further includes instructions that when executed by the processor cause the processor to determine the risk level based on at least one of a danger to an entity in the vehicle, a danger to an entity outside the vehicle, and damage to the vehicle.

11. The system of claim 10, wherein the entity outside the vehicle is a pedestrian.

12. The system of claim 7, wherein the risk level determination module further includes instructions that when executed by the processor cause the processor to determine the risk level based on a characteristic of the vehicle.

13. A non-transitory computer-readable medium including instructions that when executed by a processor cause the processor to:
determine a safety envelope having a boundary;
determine a risk level for an environment surrounding a vehicle;
associate an index value with a location within the safety envelope based on at least one of the risk level and a relationship between the location and the boundary, the relationship between the location and the boundary being based on a lateral distance between the location and the boundary; and
in response to the vehicle being located at the location, tilt a vehicle seat to a tilt angle relative to a floor of the vehicle, the tilt angle being based on the index value associated with the location.

14. The non-transitory computer-readable medium of claim 13, wherein determining the boundary of the safety envelope is based on a characteristic of the environment surrounding the vehicle.

15. The non-transitory computer-readable medium of claim 13, wherein the risk level is based on a characteristic of the environment surrounding the vehicle.

16. The non-transitory computer-readable medium of claim 13, wherein the risk level is based on at least one of a danger to an entity in the vehicle, a danger to an entity outside the vehicle, and damage to the vehicle.

17. The non-transitory computer-readable medium of claim 16, wherein the entity outside the vehicle is a pedestrian.

18. The non-transitory computer-readable medium of claim 13, wherein the risk level is based on a characteristic of the vehicle.

* * * * *